(12) United States Patent
Valenci (10) Patent No.: US 7,290,076 B2
(45) Date of Patent: Oct. 30, 2007

(54) OPTMIZING AN INTERRUPT-LATENCY OR A POLLING RATE FOR A HARDWARE PLATFORM AND NETWORK PROFILE COMBINATION BY ADJUSTING CURRENT TIMER VALUES FOR BOTH RECEIVE AND TRANSMIT DIRECTIONS OF TRAFFIC AND CALCULATING A NEW TIMER VALUE TO BE USED FOR BOTH RECEIVE AND TRANSMIT DIRECTIONS OF TRAFFIC

(75) Inventor: Moshe Valenci, Givat-Zeev (IL)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 11/107,563

(22) Filed: Apr. 14, 2005

(65) Prior Publication Data

US 2006/0236002 A1   Oct. 19, 2006

(51) Int. Cl.
*G06F 13/20* (2006.01)
*G06F 13/24* (2006.01)
*G06F 3/00* (2006.01)

(52) U.S. Cl. .................................. 710/260; 710/48

(58) Field of Classification Search ................ 710/260, 710/263, 265, 266, 48, 62, 25; 709/224, 709/236; 714/47; 370/465, 912, 230, 464; 713/500

See application file for complete search history.

(56) References Cited

U.S. PATENT DOCUMENTS

| | | | | |
|---|---|---|---|---|
| 5,995,506 A | * | 11/1999 | Fujimori | 370/389 |
| 6,304,911 B1 | * | 10/2001 | Brcich et al. | 709/237 |
| 6,748,444 B1 | * | 6/2004 | Nagashima | 709/236 |
| 6,816,510 B1 | * | 11/2004 | Banerjee | 370/503 |
| 7,028,122 B2 | * | 4/2006 | Williams | 710/260 |
| 2004/0030819 A1 | * | 2/2004 | Williams | 710/260 |
| 2004/0064542 A1 | * | 4/2004 | Williams | 709/224 |
| 2005/0078669 A1 | * | 4/2005 | Oner | 370/389 |
| 2006/0236002 A1 | * | 10/2006 | Valenci | 710/48 |
| 2006/0256792 A1 | * | 11/2006 | Kwong et al. | 370/394 |
| 2006/0256822 A1 | * | 11/2006 | Kwong et al. | 370/503 |

OTHER PUBLICATIONS

"ICIM: An Inline Network Measurement Mechanism for Highspeed Networks" by Cao et al. (abstract only) Publication Date: 03-03, Apr. 2006.*

PCI-SIG "PCI Specifications," www.pcisig.com, copyright 2004; 18 pp.

Shanley, T. and D. Anderson, "PCI System Architecture, 4th edition," Mindshare, Inc., 1999; Chapter 1 & 2, 61 pp.

(Continued)

*Primary Examiner*—Gopal C. Ray
(74) *Attorney, Agent, or Firm*—Konrad Raynes & Victor LLP; Janaki K. Davda (57) ABSTRACT

Provided are techniques for determining a timer value. An advised number of packets per interrupt for both receive and transmit directions of traffic is determined. Current timer values for both receive and transmit directions of traffic are adjusted based on the determined advised numbers of packets per interrupt. A new timer value to be used for both receive and transmit directions of traffic is calculated. Other embodiments are described and claimed.

17 Claims, 4 Drawing Sheets

OTHER PUBLICATIONS

"Serial ATA: High Speed Serialized AT Attachment," Serial ATA Workgroup rev. 1.0, Aug. 29, 2001; 36 pp.

Krueger, et al. "Small Computer Systems Interface protocol over the Internet (iSCSI) Requirements and Design Considerations," Network Working Group of The Internet Society, RFC 3347, (2002), 23 pp.

"Transmission Control Protocol: DARPA Internet Program Protocol Specification," Information Sciences Institute for Defense Advanced Research Projects Agency, RFC 793, (Sep. 1981), 80 pp.

"Internet Protocol: DARPA Internet Program Protocol Specification," Information Sciences Institute for Defense Advanced Research Projects Agency, RFC 791, (Sep. 1981), 44 pp.

IEEE Std 802.3—2002, Part 3: Carrier sense multiple access with collision detection (CSMA/CD) access method and physical layer specifications, Mar. 8, 2002; 33 pp.

"dpANS Fibre Channel Protocol for SCSI," X3.269-199X, Revision 12, Dec. 4, 1995; 75 pp.

"dpANS Information technology—SCSI Controller Commands-2", X3T10/1225D rev. 4, Sep. 12, 1997; 23 pp.

Microsoft Windows® Platform Development, "High Performance Network Adapters and Drivers in Windows," web search dated Dec. 12, 2004; 8 pp.

* cited by examiner

OPTIMIZING AN INTERRUPT-LATENCY OR A POLLING RATE FOR A HARDWARE PLATFORM AND NETWORK PROFILE COMBINATION BY ADJUSTING CURRENT TIMER VALUES FOR BOTH RECEIVE AND TRANSMIT DIRECTIONS OF TRAFFIC AND CALCULATING A NEW TIMER VALUE TO BE USED FOR BOTH RECEIVE AND TRANSMIT DIRECTIONS OF TRAFFIC

BACKGROUND

Modern network hardware uses various schemes for moderating or coalescing interrupts in order to improve performance (e.g., throughput or Central Processing Unit (CPU) utilization). Many of these schemes are not versatile enough to handle different hardware platforms (i.e., computer systems) or different network profiles, due to the large number of unbound algorithmic parameters that may be tuned per hardware platform or per configuration. That is, conventional schemes are not generic enough.

Different hardware platforms may be described as computer systems with different latencies, due to memory, CPU, and other hardware and operating system factors. For example, an Intel® Pentium® 4 hardware platform has different latencies than an Intel® Pentium® 3 hardware platform. A network profile may be described as a set of characteristics of a network, including line utilization, link speed, direction of traffic (e.g., transmit, receive or mixed (i.e., both receive and transmit)), average packet size, and burstness (i.e., amount of data sent or received over time).

An interrupt throttling rate (ITR) scheme may be described as a technique to delay an interrupt event using a settable timer. That is, the interrupt is issued when the timer reaches a set value. When practicing the ITR scheme, it is difficult to find an appropriate throttling rate for various combinations of hardware platforms and network profiles. A throttling rate may be described as the rate at which interrupts are issued. In conventional systems, there is no algorithmic way to find an optimal ITR value for a combination of a particular hardware platform and network profile.

The ITR scheme may be impacted by the hardware platform. For example, once an interrupt is fired, the latency of servicing the interrupt causes a deviation from the original planned time. Latency, in this case, refers to the amount of time it takes for a packet of data to get from the hardware receive queue to the target application that uses the packet of data. This deviation changes from one hardware platform to another. Furthermore, the latency changes in the same hardware platform as the network profile changes since the hardware platform goes through different levels of workload.

With reference to the network profile, the network profile affects, by itself, the packet handling latency. When trying to optimize the performance of a hardware platform, each network profile for that hardware platform requires a different throttling rate, where each throttling rate behaves differently on a different hardware platform. Thus, it is not effective to treat all network profiles as the same and associate a static ITR value for each network profile and hardware platform combination.

An example of a problematic network profile is a case in which a small packet test (in a Gigabit network) yields packets in rates of up to of 1.4 million packets per second (PPS). A long latency causes the internal buffers of the hardware to overflow, since an interrupt service routine may be scheduled too late. A short latency probably services the packets, but a very fast machine with a very short response time ends up with too many interrupts. There should be a tradeoff among the two, but conventional systems do not provide a reasonable approximation.

The ITR scheme is used today, but there is no technique to match the interrupt throttling rate for every hardware platform and network profile. The current state is that products on the market either impose the tuning responsibility on the user or system administrator or use static values that are not appropriate for all scenarios.

Polling may be described as a technique in which interrupts are issued at specific (e.g., scheduled) time intervals. The use of a settable timer in an ITR schema in a given platform and network profile may be imitated by using a polling timer, since the average rate of the interrupts is anticipated and may be handled in a given time delay.

Therefore, there is a need in the art for an improved technique for optimizing an interrupt-latency or polling rate value for use with a hardware platform and network profile combination.

BRIEF DESCRIPTION OF THE DRAWINGS

Referring now to the drawings in which like reference numbers represent corresponding parts throughout.

DETAILED DESCRIPTION OF THE EMBODIMENTS

In the following description, reference is made to the accompanying drawings which form a part hereof and which illustrate several embodiments. It is understood that other embodiments may be utilized and structural and operational changes may be made without departing from the scope of embodiments.

Figure 1:
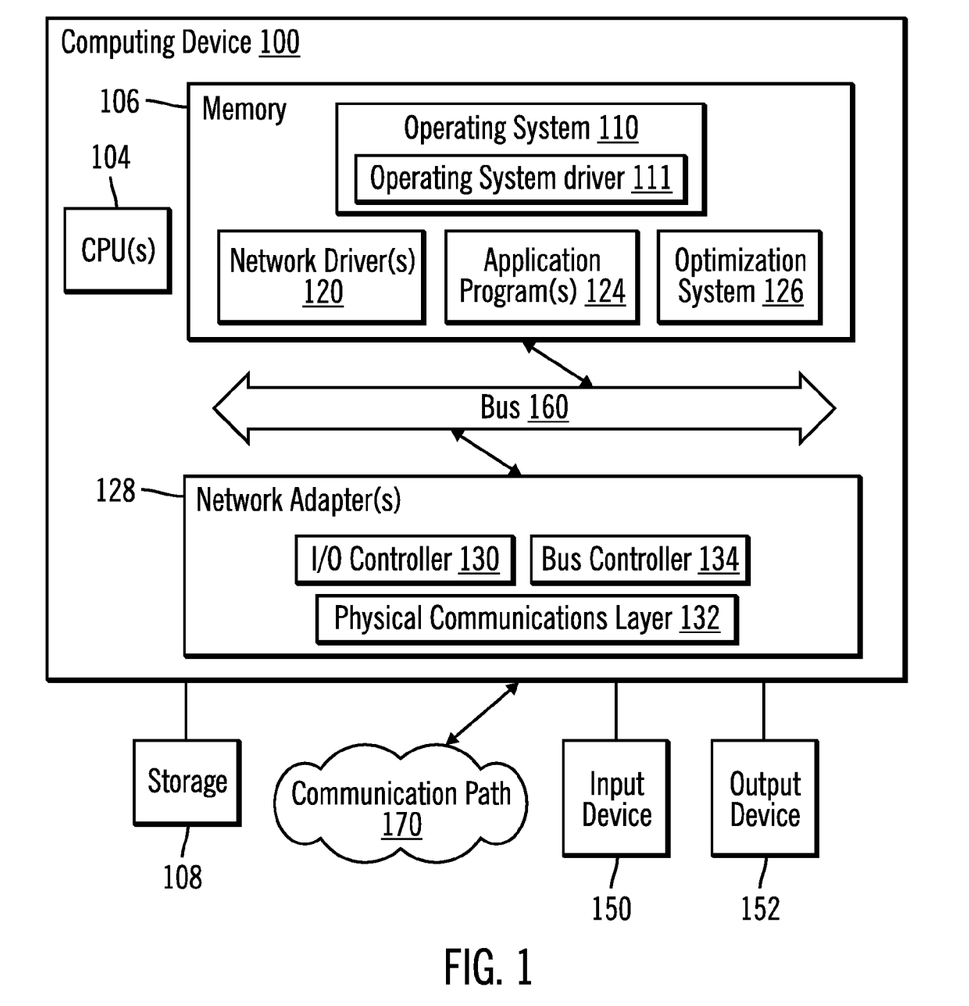
FIG. 1 illustrates a computing environment in accordance with certain embodiments.

FIG. 1 illustrates details of a computing device 100 in accordance with certain embodiments. The computing device 100 (e.g., a host computer) includes one or more central processing units (CPUs) 104 (i.e., processors), a volatile memory 106, non-volatile storage 108 (e.g., magnetic disk drives, optical disk drives, a tape drive, etc.), and one or more network adapters 128.

Memory 106 stores an operating system 110. The operating system 110 may include operating system drivers, such as an operating system driver 111. One or more network drivers 120, one or more application programs 124, and an optimization system 126 may be stored in memory 106. The optimization system 126 enables optimization of an interrupt-latency (i.e., throttling rate) and/or a polling rate. Polling may be described as a technique in which operations are performed in specific (e.g., scheduled) time intervals.

The computing device 100 may comprise any suitable computing device, such as a mainframe, server, personal computer, workstation, laptop, handheld computer, telephony device, network appliance, virtualization device, storage controller, etc. Any suitable CPU 104 and operating system 110 may be used. Programs and data in memory 106 may be swapped into storage 108 as part of memory management operations.

Communication path 170 may be any type of network such as, for example, a Storage Area Network (SAN), a Local Area Network (LAN), Wide Area Network (WAN), the Internet, an Intranet, bus, etc.

In various embodiments, the optimization system 126 may be part of a network driver that controls network hardware or within the network hardware itself. In certain embodiments, the optimization system 126 may exist as an external entity, such as a process or driver. In certain embodiments, the optimization system 126 may exist within a specific process (e.g., an application program 124) or driver that is hosted by the operating system 110. In alternative embodiments, the optimization system 126 may be part of another component (hardware and/or software) coupled to computing device 100.

Each network adapter 128 includes various components implemented in the hardware of the network adapter 128. Each network adapter 128 is capable of transmitting and receiving packets of data over communication path 170.

Each network driver 120 executes in memory 106 and includes network adapter 128 specific commands to communicate with each network adapter 128 and interface between the operating system 110 and each network adapter 128. Each network adapter 128 or network driver 120 implements logic to process packets, such as a transport protocol layer to process the content of messages included in the packets that are wrapped in a transport layer, such as Transmission Control Protocol (TCP) and/or Internet Protocol (IP), the Internet Small Computer System Interface (iSCSI) (IETF RFC 3347, published 2002), Fibre Channel (American National Standards Institute (ANSI) X3.269-199X, Revision 012, Dec. 4, 1995), or any other suitable transport layer protocol.

A bus controller 134 enables each network adapter 128 to communicate on a computer bus 160, which may comprise any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318: 1998, X3T10/1225D rev. 4, Sep. 12, 1997), Serial ATA (SATA 1.0a Specification, published Feb. 4, 2003), etc.

The network adapter 128 includes a network protocol for implementing a physical communication layer 132 to send and receive network packets to and from remote data storages over the communication path 170. In certain embodiments, the network adapter 128 may implement the Ethernet protocol, or any other suitable network communication protocol.

The network adapter 128 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 may be loaded into the memory 106 and executed by the CPU 104. An input device 150 is used to provide user input to the CPU 104, and may include a keyboard, mouse, pen-stylus, microphone, touch sensitive display screen, or any other suitable activation or input mechanism. An output device 152 is capable of rendering information transferred from the CPU 104, or other component, such as a display monitor, printer, storage, etc.

In certain embodiments, in addition to one or more drivers 120, the computing device 100 may include other drivers, such as a transport protocol driver (not shown) that performs the functions of the transport protocol layer.

The network adapter 128 may include additional logic to perform additional operations to process received packets from the computer 100 or the communication path 170. Further, the network adapter 128 may implement a transport layer offload engine (TOE) to implement the transport protocol layer in the network adapter as opposed to the network driver 120 to further reduce computing device processing burdens. Alternatively, the transport layer may be implemented in a network driver 120.

Various structures and/or buffers (not shown) may reside in memory 106 or may be located in a storage unit separate from the memory 106 in certain embodiments.

Figure 2:
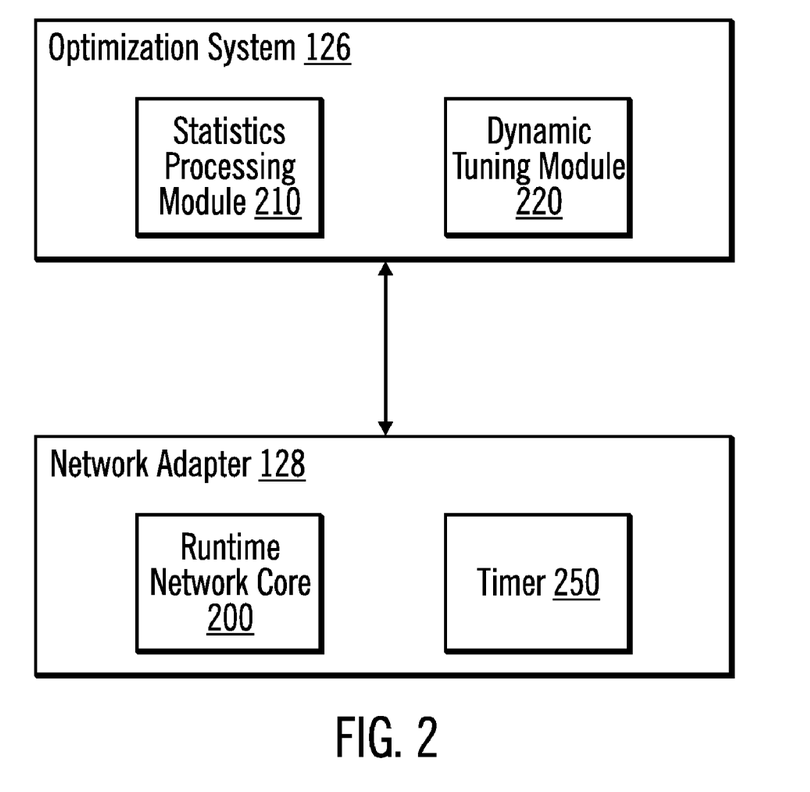
FIG. 2 illustrates further details of an optimizer and network adapter in accordance with certain embodiments.

FIG. 2 illustrates further details of an optimization system 126 and network adapter 128 in accordance with certain embodiments. The optimization system 126 includes a statistics processing module 210 and a dynamic tuning module 220. The network adapter 128 includes a runtime network core 200 and a timer 250. In alternative embodiments, the runtime network core 200 and timer 250 may be part of another component (hardware and/or software) coupled to computing device 100.

The runtime module 200, the statistics processing module 210, and the dynamic tuning module 220 may each be implemented in software, hardware, or a combination of software and hardware.

In certain embodiments, the runtime module 200, the statistics processing module 210, and the dynamic tuning module 220 may be implemented in integrated circuit components on a motherboard of a computer (e.g., computing device 100). Thus, the runtime module 200, the statistics processing module 210, and the dynamic tuning module 220 may be coupled to a motherboard. Additionally, in alternative embodiments, a video card, a disk controller and/or other components may be coupled to the motherboard. Thus, the runtime module 200, the statistics processing module 210, and the dynamic tuning module 220 may be coupled to a video card, disk controller, and/or other components. Also, the network adapter 128 may be implemented in integrated circuit components on a motherboard of a computer (e.g., computing device 100) and may be coupled to a video card, disk controller, and/or other components.

The statistics processing module 210, the dynamic tuning module 220, and the runtime network core 200 are coupled to bus 160 and communicate with each other. In alternative embodiments, rather than communication by bus, the statistics processing module 210, the dynamic tuning module 220, and the runtime network core 200 may communicate over an I/O fabric or other connection means. Embodiments may implement an interrupt-latency timer scheme using a settable timer or a polling timer. Embodiments provide a dynamic technique for optimizing optimal ITR values for each hardware platform and network profile combination. With embodiments, the optimal ITR values converge during runtime in a quick and efficient way. The optimal ITR values may be used for interrupt-latency or polling rates.

The runtime network core 220 performs receive and transmit operations. Also, the runtime network core 220 provides timer functionality. The runtime network core 220 collects statistics during runtime (referred to as "runtime parameters"). The runtime parameters include, for example, a total bytes counter for the transmit (Tx) direction of traffic and for the receive (Rx) direction of traffic, a total packets counter for the transmit (Tx) direction of traffic and for the receive (Rx) direction of traffic, and an interrupt counter value.

The statistics processing module 210 computes additional statistics (referred to as "statistical parameters"). The statistical parameters may be computed between time intervals based on runtime statistics collected by the runtime network core 220. The statistical parameters include, for example, traffic rate, average packet size, and average packets per interrupt (PPI). The traffic rate parameter is managed separately for receive and transmit directions of traffic and is computed as total bytes transmitted or received in a last timer tick, combined with the negotiated link speed. The average packet size parameter is managed separately for receive and transmit directions of traffic and may be computed as total bytes transmitted or received, respectively, in the last timer tick divided by the total packets transmitted or received, respectively, in the last timer tick. The average packets per interrupt (PPI) parameter is managed separately for receive and transmit directions of traffic and is computed as the total packets sent or received in the last timer tick divided by the interrupt counter value of the last timer tick.

The dynamic tuning module 220 uses information (i.e., statistical parameters and, in some embodiments, also runtime parameters) provided by the statistics processing module 210 to determine whether to increase or decrease the throttling rate in order to converge the desired settings in the following (i.e., subsequent) timer periods.

With the receive direction of traffic, the network adapter 128 receives a packet over the communication path 170 and fires an interrupt when a timer 250 reaches a certain value to indicate to a network driver 120 that a packet has to be processed. The network driver 120 receives the interrupt and processes the packet. If there is a delay because the timer 250 has not reached a certain value, the network adapter 128 stores the packet in memory, without interrupting the network driver 120. The interrupt is then issued when the timer 250 reaches a certain value.

With the transmit direction of traffic, the network adapter 128 transmits a packet over the communication path 170. The network adapter 128 issues an interrupt to the network driver 120 to release resources when the timer 250 reaches a certain value.

Figure 3:
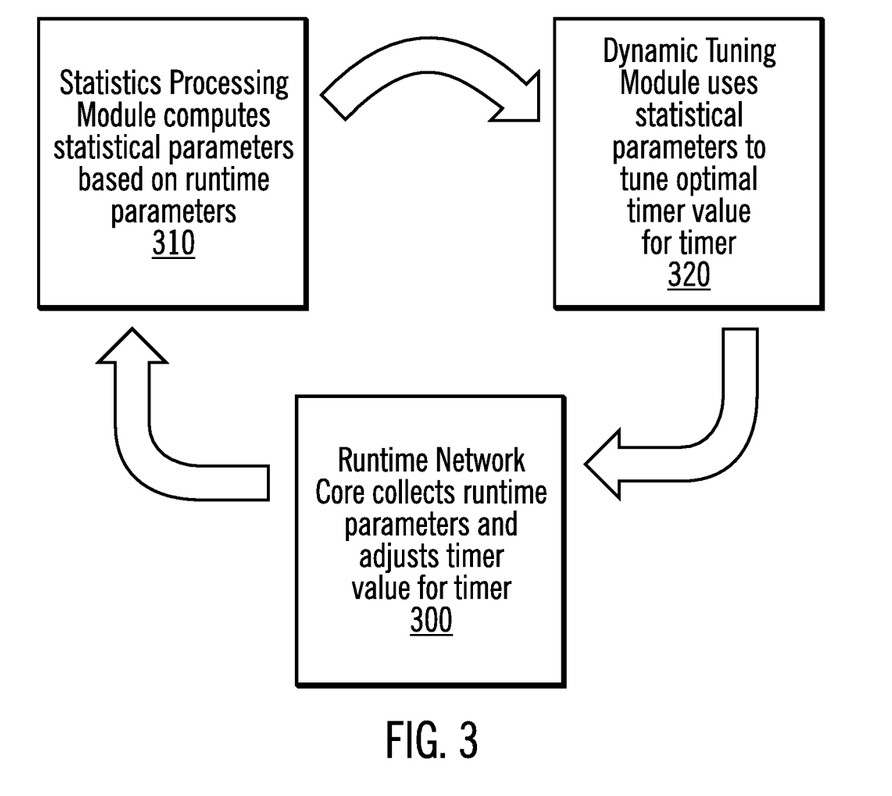
FIG. 3 illustrates the interaction between a statistics processing module, a dynamic tuning module, and a runtime network core in accordance with certain embodiments.

FIG. 3 illustrates the interaction between a statistics processing module 210, a dynamic tuning module 220, and a runtime network core 220. In block 300, the runtime network core 220 collects runtime parameters and forwards these to the statistics processing module 210. In block 310, the statistics processing module 210 computes statistical parameters based on the runtime parameters received from the runtime network core 220 and forwards these to the dynamic tuning module 220. In block 320, the dynamic tuning module 220 receives statistical parameters and, in some embodiments, runtime parameters, from the statistics processing module 210 and tunes (i.e., adjusts) the optimal timer value for the timer implemented by the runtime network core 220. Also, in block 300, the runtime network core 220 adjusts a timer value based on a new timer value from the dynamic tuning module 220. As can be seen from the cyclic nature of blocks 300-320, optimal timer values converge as the collected statistics are fed back to the dynamic tuning module 220, which generates new timer values to be used by the runtime network core 200.

With embodiments, the convergence of a timer value to an optimal timer value may be achieved after a few iterations. With the iterative process, embodiments enable tuning timers based on measured feedback results (i.e., from previous iterations). Because of the iterative process used to determine the optimal timer value, embodiments may be described as generic, adaptive, and/or self-tuning.

Figure 4:
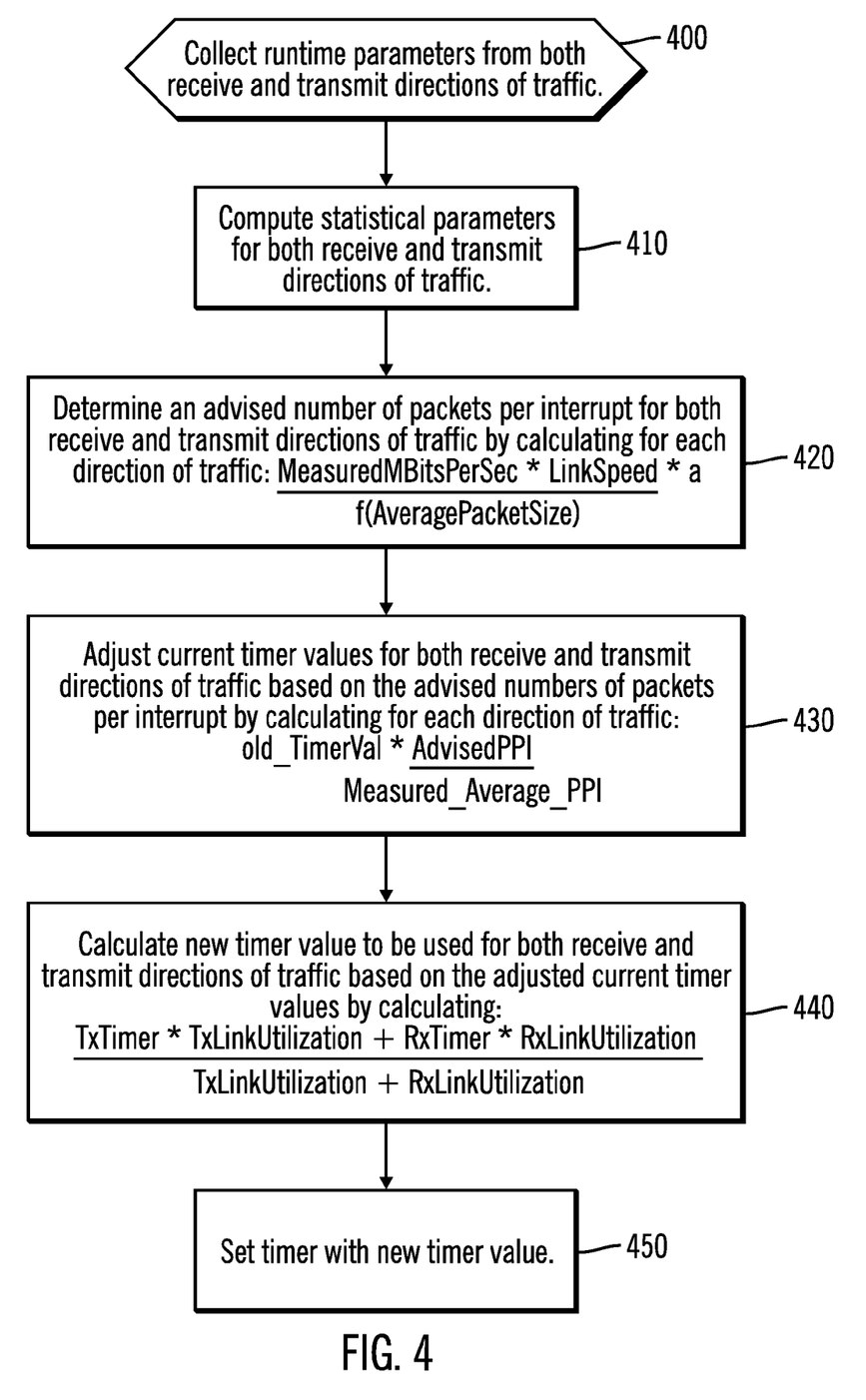
FIG. 4 illustrates operations for determining an optimal ITR value in accordance with certain embodiments.

FIG. 4 illustrates operations for determining an optimal ITR value in accordance with certain embodiments. In certain embodiments, the operations of FIG. 4 may occur periodically. In certain alternative embodiments, the operations of FIG. 4 may be triggered by one or more events.

In block 400, the runtime network core 200 of the network adapter 128 collects runtime parameters from both receive and transmit directions of traffic and forwards these to the statistics processing module 210. In block 410, the statistics processing module 210 of the optimization system 126 computes statistical parameters for both receive and transmit directions of traffic. In block 420, the dynamic tuning module of the optimization system 126 determines an advised number of packets per interrupt for both receive and transmit directions of traffic.

The dynamic tuning module 220 uses several heuristics to determine the advised number of packets per interrupt. The heuristics described herein were defined based on experiments. In various embodiments fewer, more, and/or different heuristics may be used. First, if the packet rate in a network decreases, there are to be fewer packets per interrupt. That is, the dynamic tuning module 220 increases responsiveness if the rate drops or is inherently low. Second, if the average size of a packet decreases, there are to be more packets per interrupt. Packet size corresponds to the packet transfer time. Thus, more packets of a smaller size are transferred in a unit of time without latency. Similarly, there may be a small delay when handling large sized packets (e.g., Jumbo frames that are over 1500 bytes) because fewer packets of larger size are sent in a unit of time. Third, if the link speed is reduced, there are to be fewer packets per interrupt (regardless of the measured rate) because it takes more time to transfer a packet over a slower link.

Quantifying the heuristics described herein produces the following Equation (1):

$$AdvisedPPI \approx \frac{MeasuredMBitsPerSec * LinkSpeed}{f(AveragePacketSize)} * \alpha \qquad \text{Equation (1)}$$

Equation (1) is computed for receive and transmit directions of traffic separately because each direction may have different measured values (e.g., MeasuredMBitsPerSecond, LinkSpeed, and AveragePacketSize). MeasuredMBitsPerSecond may be described as a measured traffic rate (or "transfer rate") in mega bits per second (Mbps) and is collected by the statistics processing module 210. LinkSpeed may be described as a negotiated link speed in Mbps. The link speed is negotiated during Out-Of-Band (OOB) communications. Out-Of-Band communications may be described as those that occur between a sender computing device and a receiver computing device on a different channel that is used for the purpose of exchanging such information. AveragePacketSize may be described as a measured average packet size in octets (where an octet is 8 bits) and is computed by the statistics processing module 210.

The function f may be described as a system independent function. In certain embodiments, the function f may be an identity function (i.e., f(x)=x). The function f distributes weight for every average packet size. For the identity function, weight is proportional to the average packet size. The constant a may be described as a system independent constant value. The constant a defines the aggressiveness of the interrupt moderation. The constant a may be different for receive and transmit directions of traffic. The constant a may be determined experimentally. The AdvisedPPI indicates an advised number of packets per interrupt (PPI).

With reference to Equation (1), the advised number of packets per interrupt is approximated by the measured traffic rate times a negotiated link speed, divided by a function over a measured average packet size, and multiplied by a constant. In particular, the advised number of packets per interrupt is calculated by multiplying a measured traffic rate by a negotiated link speed to generate a first value, calculating a function over a measured average packet size to generate a second value, dividing the first value by the second value to generate a third value, and multiplying the third value by a constant. The result is an advised number of packets per interrupt for the receive direction of traffic and an advised number of packets per interrupt for the transmit direction of traffic.

For example, with the constant $\alpha = 16/1000$, the function $f$ being the identity function, and a link speed of 1 gigabits per second, the following Table A is defined:

TABLE A

|  | 20% network utilization | 50% network utilization | 100% network utilization |
|---|---|---|---|
| 64 byte packets | 50 | 125 | 250 |
| 1514 byte packets | 2 | 5 | 10 |
| 16K byte packets | 1 | 1 | 1 |

In Table A, with reference to Equation (1), the first column identifies an average packet size (AveragePacketSize), and the first row identifies network utilization. The network utilization is MeasuredMBitsPerSecond relative to link speed. For example, 10 megabits per second (Mbps) results in 1% network utilization on a 1 gigabits per second (Gbps) link speed and in 100% network utilization in a 10 megabits per second link speed. Merely to provide an example, Table A is defined for a 1 gigabits per section link speed, but any link speed may be used. Thus, network utilization as a percentage (%) is used in Table A, rather than actual traffic rate (i.e., MeasuredMBitsPerSecond). Thus, for a given AveragePacketSize and network utilization, the dynamic tuning module 220 is able to provide an AdvisedPPI.

As another example, with the constant $\alpha = 16/1000$, the function $f$ being the identity function, and a link speed of 100 Mbps, the following Table B is defined:

TABLE B

|  | 20% network utilization | 50% network utilization | 100% network utilization |
|---|---|---|---|
| 64 byte packets | 5 | 12 | 25 |
| 1514 byte packets | 1 | 1 | 1 |
| 16K byte packets | 1 | 1 | 1 |

With the examples illustrated with Table A and Table B, the dynamic tuning module 220 uses Equation (1) to recommend a number of packets per interrupt (PPI) based on the measured parameters on the hardware platform and the network profile.

The values in Table A and Table B may be determined by, for example, experimental measurements over a large variety of hardware platforms and network profiles. The values in Table A and Table B may change based on a desired rate of packets per interrupt.

In block 430, the dynamic tuning module 220 of the optimization system 126 adjusts the current timer values for both receive and transmit directions of traffic based on the advised numbers of packets per interrupt. That is, the timer value for each direction of traffic is tuned to match the advisedPPI using Equation (2).

$$\text{new\_TimerVal} \approx \text{old\_TimerVal} * \frac{AdvisedPPI}{Measured\_Average\_PPI} \quad \text{Equation (2)}$$

In Equation (2), the new timer value (new_TimerVal) is determined based on the current timer value (old_TimerVal). The new timer value is adjusted (increased or decreased) in a proportional manner to the current timer value, where the proportion is determined by AdvisedPPI/Measured_Average_PPI. The measured average packet per interrupt (Measured_Average_PPI) is collected by the statistics processing module 210 and is an average number of packets per interrupt. In certain embodiments, the timer value may be small, but not zero. In certain embodiments, based on a measured simulation, the timer converges to an optimal value.

In particular, for each direction of traffic, a new timer value is approximated by an old timer value multiplied by an advised number of packets per interrupt for that direction of traffic divided by an average number of packets per interrupt. Thus, the new timer value is calculated by dividing an advised number of packets per interrupt for a particular direction of traffic by an average number of packets per interrupt to generate a first value and multiplying an old timer value by the first value. The result is a transmit timer value (TxTimer) and a receive timer value (RxTimer).

In block 440, the dynamic tuning module 220 of the optimization system 126 calculates a new timer value (for both receive and transmit directions of traffic) based on the adjusted current timer values. Each direction of traffic (receive and transmit) has a separate Advised PPI and a timer value. In certain embodiments, the dynamic tuning module 220 uses Equation (3) to determine a timer value (for both receive and transmit), which is a refined median based on the receive (Rx) and transmit (Tx) values.

$$TimerVal = \frac{TxTimer * TxLinkUtilization + RxTimer * RxLinkUtilization}{TxLinkUtilization + RxLinkUtilization} \quad \text{Equation (3)}$$

The TxTimer value is the new_TimerVal determined for transmit. The TxLinkUtilization value is computed as a ratio between the traffic rate and the link speed. The RxTimer value is the new_TimerVal determined for receive. RxLinkUtilization value is computed as a ratio between the traffic rate and the link speed. In particular, the timer value (TimerVal) is calculated by multiplying the transmit timer value by the transmit link utilization value to generate a first value, multiplying the receive timer value by the receive link utilization value to generate a second value, adding the first value and the second value to generate a third value, adding the transmit link utilization and the receive link utilization to generate a fourth value, and dividing the third value by the fourth value. Thus, the timer value may be incremented in a proportional manner, rather than in increments.

In block 450, a timer is set with the new timer value. In particular, the dynamic tuning module 220 of the optimization system 126 forwards the calculated timer value to the runtime network core 200 of the network adapter 128, which updates the timer value for a timer 250 (e.g., an interrupt-latency timer or for a polling rate timer). In certain embodiments, one timer 250 may be used for both the receive and transmit directions of traffic. In this manner, embodiments provide a technique that enables determining a timer value for an Interrupt Throttling Rate (ITR) scheme that uses a settable timer or a polling timer.

By optimizing timer values, embodiments enable optimizing interrupt-latency and polling rates for various hardware platform and network profile combinations and improve overall system performance in a manner that is independent of a hardware platform and a network profile.

Intel is a registered trademark and/or common law mark of Intel Corporation in the United States and/or foreign countries.

Additional Embodiment Details

The described embodiments may be implemented as a method, apparatus (or system) or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any suitable information bearing medium. Additionally, the devices, adaptors, etc., may be implemented in one or more integrated circuits on the adaptor or on the motherboard.

The term logic may include, by way of example, software or hardware and/or combinations of software and hardware.

The illustrated operations of FIG. 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method capable of determining a timer value, comprising:
    determining an advised number of packets per interrupt for both receive and transmit directions of traffic;
    adjusting current timer values for both receive and transmit directions of traffic based on the determined advised numbers of packets per interrupt; and
    calculating a new timer value to be used for both receive and transmit directions of traffic based on the adjusted current timer values.

2. The method of claim 1, further comprising:
    collecting runtime parameters from both receive and transmit directions of traffic.

3. The method of claim 2, further comprising:
    a runtime network core coupled to a network adapter, wherein the runtime network core is operable to collect runtime parameters and to set a timer with the new timer value.

4. The method of claim 1, further comprising:
    computing statistical parameters for both receive and transmit directions of traffic.

5. The method of claim 4, further comprising:
    a statistics processing module coupled to a network adapter, wherein the statistics processing module is operable to compute the statistical parameters.

6. The method of claim 1, wherein determining the advised number of packets per interrupt for each direction of traffic farther comprises:
    multiplying a measured traffic rate by a negotiated link speed to generate a first value;
    calculating a function over a measured average packet size to generate a second value; dividing the first value by the second value to generate a third value; and
    multiplying the third value by a constant.

7. The method of claim 1, wherein adjusting the current timer values for each direction of traffic further comprises:
    dividing an advised number of packets per interrupt for that direction of traffic by an average number of packets per interrupt to generate a first value; and
    multiplying an old timer value by the first value.

8. The method of claim 1, wherein the current timer values comprise a transmit timer value and a receive timer value and wherein calculating the new timer value further comprises:

multiplying the transmit timer value by a transmit link utilization value to generate a first value;
multiplying the receive timer value by a receive link utilization value to generate a second value;
adding the first value and the second value to generate a third value;
adding the transmit link utilization and the receive link utilization to generate a fourth value; and
dividing the third value by the fourth value.

9. The method of claim 1, further comprising:
setting a timer with the new timer value, wherein interrupts are fired based on the new timer value.

10. The method of claim 1, further comprising:
a dynamic tuning module coupled to a network adapter, wherein the dynamic tuning module is operable to determine the advised number of packets per interrupt, to adjust the current timer values, and to calculate the new timer value.

11. An article of manufacture, wherein the article of manufacture comprises a computer readable medium storing instructions, and wherein the article of manufacture is operable to:
determine an advised number of packets per interrupt for both receive and transmit directions of traffic;
adjust current timer values for both receive and transmit directions of traffic based on the determined advised numbers of packets per interrupt; and
calculate a new timer value to be used for both receive and transmit directions of traffic based on the adjusted current timer values.

12. The article of manufacture of claim 11, wherein the article of manufacture is operable to:
collect runtime parameters from both receive and transmit directions of traffic.

13. The article of manufacture of claim 11, wherein the article of manufacture is operable to:
compute statistical parameters for both receive and transmit directions of traffic.

14. The article of manufacture of claim 11, wherein for the instructions for determining the advised number of packets per interrupt for each direction of traffic, the article of manufacture is operable to:
multiply a measured traffic rate by a negotiated link speed to generate a first value;
calculate a function over a measured average packet size to generate a second value; divide the first value by the second value to generate a third value; and multiply the third value by a constant.

15. The article of manufacture of claim 11, wherein for the instructions for adjusting the current timer values for each direction of traffic, the article of manufacture is operable to:
divide an advised number of packets per interrupt for that direction of traffic by an average number of packets per interrupt to generate a first value; and
multiply an old timer value by the first value.

16. The article of manufacture of claim 11, wherein the current timer values comprise a transmit timer value and a receive timer value and wherein for the instructions for calculating the new timer value, the article of manufacture is operable to:
multiply the transmit timer value by a transmit link utilization value to generate a first value;
multiply the receive timer value by a receive link utilization value to generate a second value;
add the first value and the second value to generate a third value;
add the transmit link utilization and the receive link utilization to generate a fourth value; and
divide the third value by the fourth value.

17. The article of manufacture of claim 11, wherein the article of manufacture is operable to:
set a timer with the new timer value, wherein interrupts are fired based on the new timer value.

* * * * *

UNITED STATES PATENT AND TRADEMARK OFFICE
CERTIFICATE OF CORRECTION

PATENT NO. : 7,290,076 B2  
APPLICATION NO. : 11/107563  
DATED : October 30, 2007  
INVENTOR(S) : Moshe Valenci It is certified that error appears in the above-identified patent and that said Letters Patent is hereby corrected as shown below:

Column 10, Line 51 delete "farther" and replace with -- further --

Signed and Sealed this

Tenth Day of November, 2009

David J. Kappos  
*Director of the United States Patent and Trademark Office*